INVENTOR.
ALPHEUS W. LARSON
BY
Andrus & Starke
Attorneys

Sept. 3, 1963   A. W. LARSON   3,102,739
COMBINED MEMO PAD AND PENCIL HOLDER
Filed June 5, 1961   3 Sheets-Sheet 2
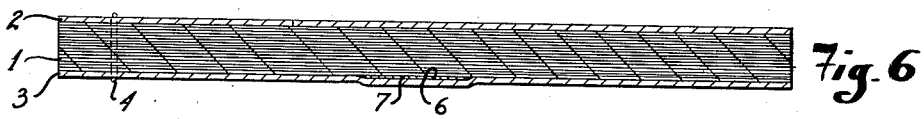
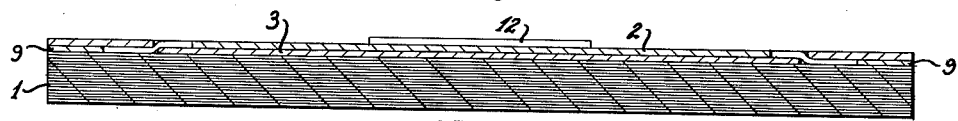
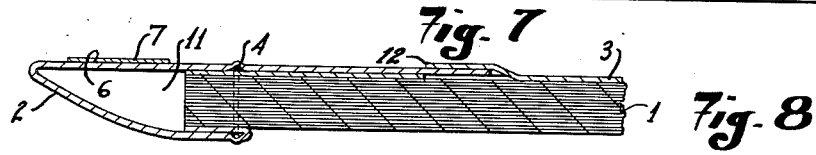
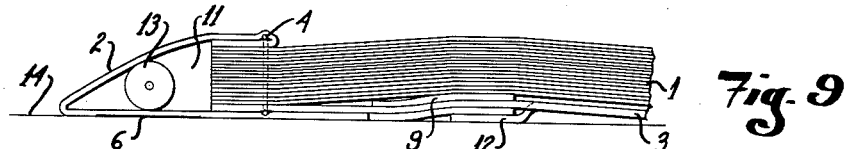
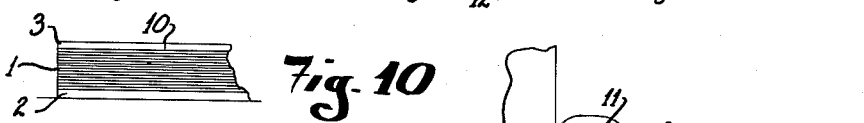
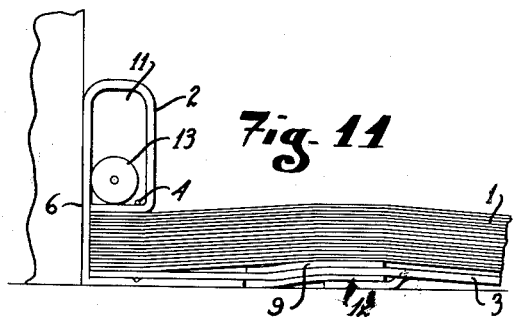
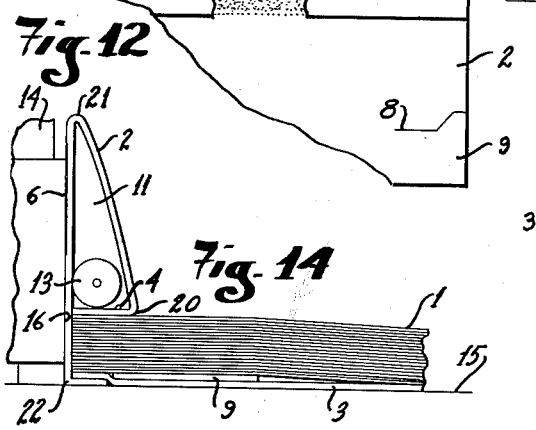
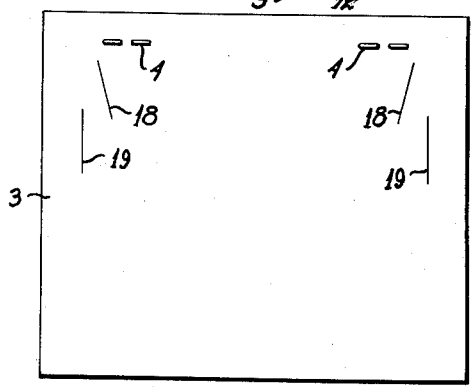
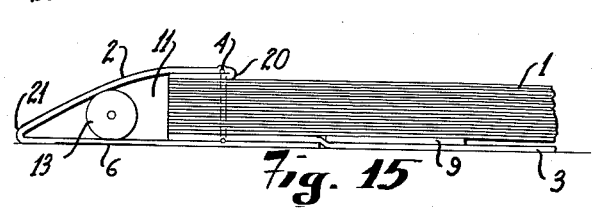
INVENTOR.
ALPHEUS W. LARSON
BY
Andrus & Starke
Attorneys

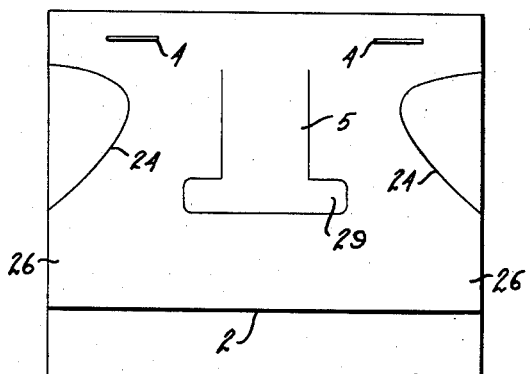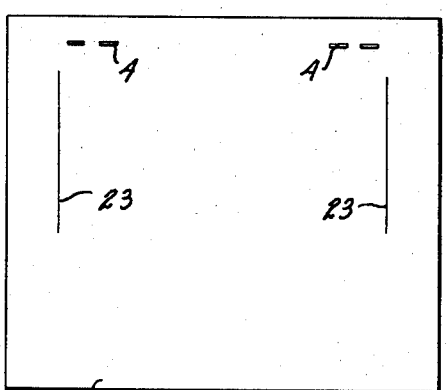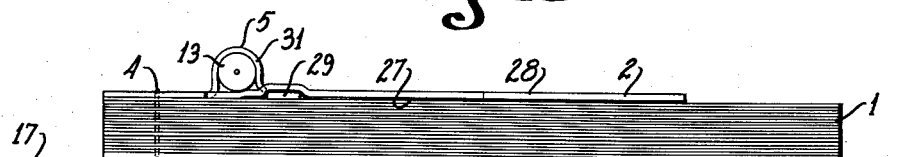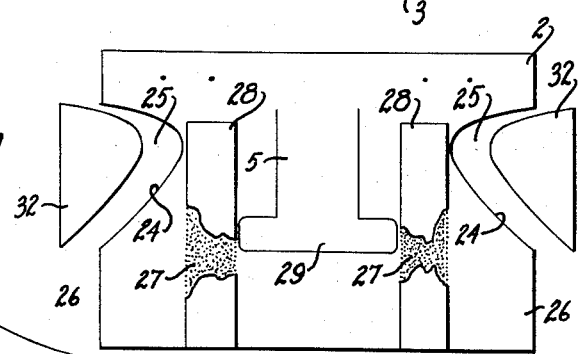

United States Patent Office 3,102,739
Patented Sept. 3, 1963

3,102,739
COMBINED MEMO PAD AND PENCIL HOLDER
Alpheus W. Larson, Chilton, Wis.
Filed June 5, 1961, Ser. No. 114,996
8 Claims. (Cl. 281—15)

This invention relates to a combined memo pad and pencil holder which is made and shipped as a pad having a cover out of which the user makes a pencil holder as a part of the pad.

Heretofore such combined memo pads and pencil holders have been of a construction corresponding to that of United States Letters Patent No. 2,787,084, wherein the cover had an integral hinge and front and back out of which a tongue was formed to provide a pencil holder.

The present invention avoids the necessity for the hinge portion of the cover integrally joining the front and back and provides a substantial saving in cost of manufacture by forming the pencil holder solely from the front cover.

Other features of the invention lie in providing alternative ways of forming the pencil holder to accommodate different pad uses, in some of which the front cover may be bent back over the upper edge of the pad and secured to the back, and adhesive may be disposed in areas beneath the front cover and exposed by the backward formation of the same for securing the pad in a position for use. In certain embodiments it is possible to provide for securing the pad in selected positions of use.

Certain of these features of the invention are the subject of applicant's copending application Serial No. 6,491, filed February 3, 1960, now abandoned, and of which the present application is a continuation in part.

The accompanying drawings illustrate the best mode presently contemplated by the inventor for carrying out the invention.

In the drawings:

FIG. 6 is a sectional view taken substantially on line 6—6 of FIG. 2;

FIG. 7 is a sectional view taken substantially on line 7—7 of FIG. 3;

FIG. 8 is a sectional view taken substantially on line 8—8 of FIG. 3;

FIG. 9 is a side elevation of a portion of the pad of FIGURES 1 to 8 showing one way in which it can be secured to a surface and provide a pencil holder;

FIG. 10 is a sectional view taken substantially on line 10—10 of FIGURE 2;

FIG. 11 is a view similar to FIG. 9 showing another way in which the pad can be secured to a surface and provide a pencil holder;

FIG. 12 is a fragmentary plan view of the underside of the front cover of the pad of FIGS. 1 to 11, inclusive;

FIG. 13 is a rear plan view of a modified form of back for the pad;

FIG. 14 is a side elevation showing one form of pencil holder utilizing the back of FIG. 13;

FIG. 15 is a side elevation showing an alternative form of pencil holder utilizing the back of FIG. 13;

FIG. 16 is a top plan view of another embodiment of the invention employing a tongue formed solely in the front cover to provide a pencil holder;

FIG. 17 is a rear plan view of the back of the pad of FIG. 16;

FIG. 18 is a side elevation showing the backward folding of the front cover of the pad of FIGS. 16 and 17, and the formation of the pencil holder;

FIG. 19 is a side elevation of the pad of FIGS. 16 to 18 and showing another formation for the pencil holder;

FIG. 20 is a plan view of the underside of the front cover of the pad of FIGS. 16 to 19; and FIG. 21 is a fragmentary side elevation with parts broken away and showing attachment of the pad of FIGS. 16 to 20 to a telephone.

Figure 1:
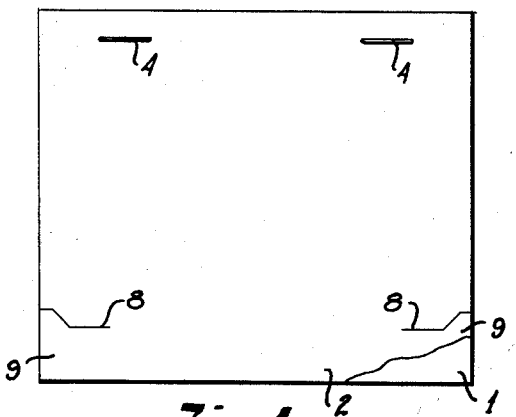
FIGURE 1 is a top plan view of a pad having certain features of the invention.
Figure 2:
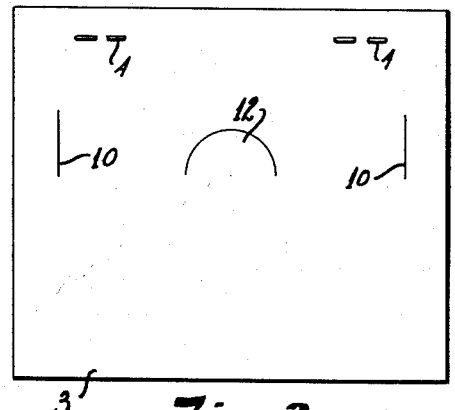
FIG. 2 is a rear plan view of the pad of FIGURE 1.

The several embodiments of the invention basically comprise a pad consisting of a plurality of sheets of paper 1 stacked together with separate front and back covers 2 and 3, respectively, all of which are secured together along the upper edge as by staples 4, or other suitable means.

The pencil holder may be formed by providing a space between the upper edge of the pad and a rearward fold of the front cover as illustrated in detail in FIGS. 9 and 11 for the embodiment of FIGS. 1–12, and in FIGS. 14 and 15 for the embodiment of FIGS. 13–15.

Where a tongue 5 is provided in the front cover, the pencil holder may be formed therefrom either as shown in FIG. 18 or FIG. 19.

The underside of the front cover 2 is provided in each instance with one or more areas 6 of adhesive and which are initially protected by a removable covering strip 7. The location of adhesive area 6 generally provides for selectively securing the pad in different positions of use.

Referring to the embodiment of FIGS. 1–12, inclusive, the front 2 of the pad has a pair of slots 8 extending inwardly from opposite side edges thereof and near the lower free edge of the pad to provide a pair of tabs 9 adapted to secure the front in rearward folded condition.

The back 3 of the pad has a pair of slots 10 shown as substantially near the side edges of the pad and parallel thereto at location to receive the corresponding tabs 9 therethrough when the front 2 is bent backward over the upper edge of the pad, to thereby secure the front in a folded condition forming the pencil holder 11.

The back 3 may also have a central curved tab 12 formed by a semi-circular cut therein and adapted to receive the lower edge of front 2 when the tabs 9 are inserted in slots 10.

As shown in FIG. 9, the pencil holder 11 extends in the general plane of the pad so that the pencil 13 lies in a space defined by the folded front 2 and the thick upper edge of the pad as represented by the stack of sheets 1.

As shown in FIG. 11, the pencil holder 11 extends upwardly from the surface of the pad and the pencil 13 lies in a space defined by the folded front 2 and the top of front 2 in the region of staples 4.

The difference between FIGS. 9 and 11 is in the manner of folding of front 2 and is generally determined by the intended position of use for the pad.

Figure 5:
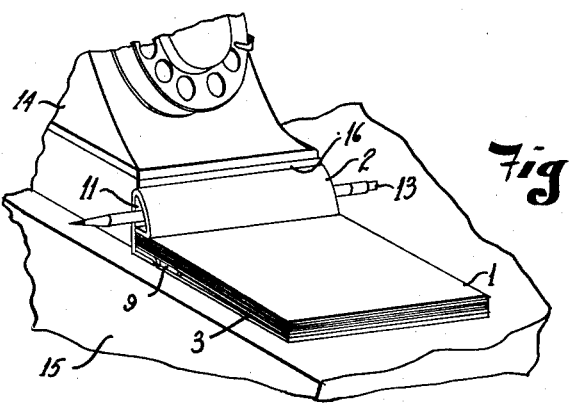
FIG. 5 is a perspective view showing the pad secured to a telephone.

If the pad is to lie on a desk 15 in front of a telephone 14 as shown in FIG. 5, the vertical portion of the front 2 that abuts the front 16 of the telephone has a suitable adhesive strip 6 thereon which secures it to the telephone. Prior to installation the adhesive 6 is covered by a removable protective strip 7, as shown in FIG. 12, and is located on the underside of the front 2.

Figure 3:
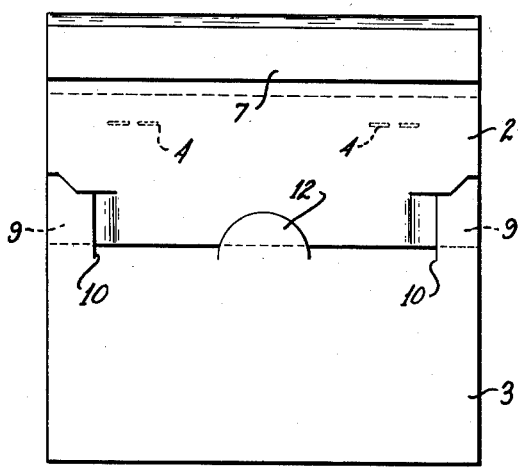
FIG. 3 is a rear plan view of the pad of FIGURE 1 after the pencil holder has been formed.
Figure 4:
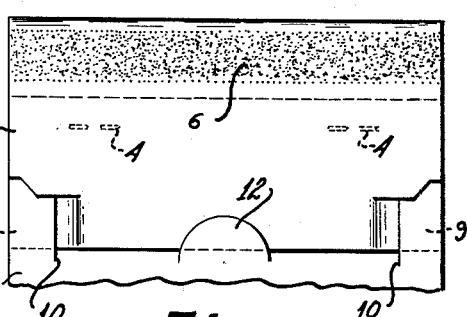
FIG. 4 is a fragmentary view similar to FIG. 3 but with an adhesive strip exposed for securing the pad in place.

If the pad is to be secured on a desk top, the front 2 is folded as shown in FIGS. 3, 4 and 9, and adhesive 6 faces downwardly and secures the pad to the top of the desk 17.

In the construction of FIGS. 13–15, the back 3 has two pairs of slots 18 and 19, respectively, for receiving tabs 9 of front cover 2. The front 2 is formed with three parallel cross creases therein, crease 20 being adjacent staples 4, crease 21 being above the location of adhesive strip 6, and crease 22 being below the strip 6.

In folding front 2 of FIGS. 13–15 the area of adhesive strip 6 between creases 21 and 22 should be either vertical as shown in FIG. 14 or horizontal as shown in FIG. 15. When the adhesive strip 6 is vertical and pencil holder 11 is above the pad, as shown in FIG. 14, the tabs 9 are inserted through slots 18 in back 3. When the adhesive strip 6 is horizontal and pencil holder 11 is disposed in the general plane of the pad, as shown in FIG. 15, the tabs 9 are inserted through slots 19 in back 3.

The slots 8 are formed with an upward curve at the edge of the pad to provide a hook effect when tabs 9 are inserted in either slots 18 or 19, and thereby prevent accidental release of the tabs. This eliminates the necessity of tab 12 in this construction.

The individual slots 18 are disposed at opposite angles to the corresponding side edge of the pad as shown in FIG. 13, and thereby greatly facilitate insertion of tabs 9 therethrough. Slots 19 are shown as parallel to the side edges of the pad, although these may also be disposed at an angle, if desired.

The modified construction of FIGS. 16–21 has only a single pair of slots 23 in back 3 and front 2 has a scallop-like cut 24 in each side edge providing for removal of a portion of the cover to form a recess 25 in each side leaving the lower portion of the front to constitute tabs 26 which may be inserted through slots 23 when front 2 is folded tightly over the upper edge of the pad.

The underside of front 2 in this embodiment is provided with vertical strips of adhesive 27 protected by removable cover strips 28. The space between strips 28 is cut to provide the tongue 5 having a head 29 at its lower free end and which is positioned beneath the front 2 when the latter has been folded back and secured in slots 23, so that the central portion of tongue 5 may be curved outwardly in the general plane of the pad to form a loop 30 for receiving and holding a pencil, as shown in FIG. 18. The adhesive 27 in this instance, after removal of strips 28, may be employed to secure the pad down to a desk top 17.

In FIG. 19, the pencil holding loop 31 is formed in front 2 while the latter is flat on the pad, in which case the pencil 13 lies flat across the top of the pad and the pad is otherwise unsecured.

In FIGS. 20 and 21 the recess 25 provided by removal of tab 32 at cut 24 is adapted to receive the supporting pad 33 on the base of the telephone.

The invention provides a pad construction of substantial versatility, and which can be modified to incorporate various desired features. By making the pencil holder from a folding of either the entire width of front 2 or from a portion of it, as the tongue 5, it is possible to employ a single front cover piece free from the back and without requiring an integral hinge portion as in the previous patent by applicant, referred to above.

Various modes of carrying out the invention are contemplated as being within the scope of the following claims particularly pointing out and distinctly claiming the subject matter which is regarded as the invention.

I claim:

1. A memo pad and pencil holder comprising a bottom cover having a pair of spaced vertical slots therein as well as a semi-circular slot providing a semi-circular tab centrally located between said vertical slots, a plurality of sheets of paper stacked on said bottom cover, a top cover having a pair of spaced slots angularly disposed to the bottom edge thereof to form a pair of tabs holding the top cover when folded backwardly under said bottom cover by securement of the tabs in the corresponding slots of said bottom cover with the bottom edge of said top cover secured under the edge of said semi-circular tab of said bottom cover, and a strip of adhesive and a protective cover strip on the normal underside of said top cover, said adhesive providing a means of attachment of said memo pad and pencil holder to a flat surface, when said protective cover strip is removed.

2. A combined memo pad and pencil holder comprising a stack of superimposed writing sheets, a back formed of heavier sheet material and having a pair of spaced slots adjacent the corresponding side edges thereof and extending in the general direction of said side edges, a front cover sheet cut to provide a pair of tabs in the opposite side edges thereof near the lower end of the cover sheet, means securing said writing sheets, back and cover sheet together at the upper edges thereof to form a pad, and fold means constituting solely a portion of said front cover sheet for forming a pencil holder loop integral therewith, said tabs being adapted to be inserted through said slots to secure the front cover when bent backwardly over the upper edge of the pad.

3. A combined memo pad and pencil holder comprising a stack of superimposed writing sheets, a back formed of heavier sheet material, a front cover sheet, means securing said writing sheets, back and cover sheets together at the upper edges thereof to form a pad, and fold means constituting solely a portion of said front cover sheet for forming a pencil holder loop integral therewith, said fold means comprising a tongue initially partially cut in the face of said front cover sheet and having a head at its free end with the body of said tongue constituting a pencil holding loop when folded upwardly from said cover sheet and the head of said tongue interlocked beneath the sheet.

4. The construction of claim 2 in which said fold means comprises a tongue initially partially cut in the face of said front cover sheet and having a head at its free end adapted to interlock beneath the cover sheet when the body of the tongue is displaced outwardly of the cover sheet to form a pencil receiving loop.

5. The construction of claim 4, in which said slots are positioned to require a tight folding of the front cover sheet backwardly over the upper edge of the pad when the tabs are inserted in the slots, and the pencil holder loop is provided at the upper edge of the pad and in the general plane of the pad.

6. The construction of claim 2 in which a second pair of slots are provided in said back in general alignment with said first-named pair and spaced longitudinally therefrom to provide for selective securement of the tabs in either pair of slots and thereby determine the positioning of said fold means and either in the general plane of the pad or above the upper edge of the pad.

7. The construction of claim 6 in which a strip of adhesive material extends across the underside of the front cover sheet in the region near to said tabs for securing the pad selectively to a flat horizontal surface or a vertical surface depending upon the corresponding positioning of said pencil holder loop either in the general plane of the pad or above the pad.

8. The construction of claim 4 in which adhesive means provided on the underside of said cover sheet is adapted to secure the pad to a supporting means.

References Cited in the file of this patent
UNITED STATES PATENTS

| | | |
|---|---|---|
| 1,865,149 | Smith | June 28, 1932 |
| 2,787,084 | Larson | Apr. 2, 1957 |